(12) United States Patent
Lu et al.

(10) Patent No.: US 7,533,447 B2
(45) Date of Patent: May 19, 2009

(54) HINGE

(75) Inventors: Sheng-Nan Lu, Shulin (TW); Wen-Yi Kuo, Shulin (TW); Chia-Ko Chung, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 430 days.

(21) Appl. No.: 11/396,582

(22) Filed: Apr. 4, 2006

(65) Prior Publication Data

US 2007/0050941 A1 Mar. 8, 2007

(30) Foreign Application Priority Data

Sep. 6, 2005 (TW) .............. 94215287 U

(51) Int. Cl.
*E05D 11/10* (2006.01)
(52) U.S. Cl. .......................... 16/334; 16/330
(58) Field of Classification Search ............ 16/334, 16/335, 336, 303, 330, 342; 361/680, 681, 361/682, 683; 455/575.1, 575.3, 575.4, 575.8, 455/550.1, 90.3; 348/373, 333.06, 794
See application file for complete search history.

(56) References Cited

U.S. PATENT DOCUMENTS 4,718,127 A * 1/1988 Rittmann et al. ............. 2/424
5,799,371 A * 9/1998 Lin ............................ 16/330
5,894,635 A * 4/1999 Lu ............................. 16/342
6,256,838 B1 * 7/2001 Lu ............................. 16/342
6,983,514 B2 * 1/2006 Lu et al. ..................... 16/342
6,986,188 B2 * 1/2006 Lu et al. ..................... 16/330
2002/0042971 A1 * 4/2002 Liao .......................... 16/342
2006/0048337 A1 * 3/2006 Lowry et al. ................ 16/342

FOREIGN PATENT DOCUMENTS

JP 2000297574 * 10/2000

* cited by examiner

*Primary Examiner*—Chuck Y. Mah
(74) *Attorney, Agent, or Firm*—Rabin & Berdo, P.C.

(57) ABSTRACT

A hinge for a portable computer having a monitor with a pivotal end and a main frame with a pivotal end has a sleeve, a washer and a pivotal rod. The sleeve is mounted in the pivotal end of the main frame and has multiple cutouts. The cutouts are formed in the sleeve. The washer has two extensions. The extensions are formed on the washer and selectively engage the cutouts of the sleeve. The pivotal rod is mounted rotatably in the sleeve, is mounted securely in the washer and holds the washer between the pivotal rod and the sleeve. When the monitor pivots to open relative to the main frame of the portable computer, the extensions of the washer engage the cutouts of the sleeve to hold the monitor at a desired visual angle.

2 Claims, 8 Drawing Sheets

US 7,533,447 B2

HINGE

BACKGROUND OF THE INVENTION

1. Field of the Invention

The present invention relates to a hinge, and more particularity to a hinge of a portable computer that can position a monitor and a main frame when the monitor is pivotally opened to the main frame.

2. Description of Related Art

A portable computer is easy to carry and is available to any situation so that the portable computer is wildly used by many people. With reference to FIG. 8, the portable computer (70) comprises a main frame (72) with a pivotal end, a monitor (71) with a pivotal end and two hinges.

With further reference to FIG. 9, each hinge has a pivotal rod (50) and a sleeve (60). The sleeve (60) has a mounted end, a pivoting end and a receiving recess. The mounted end of the sleeve (60) is mounted in the pivotal end of the main frame (72). The receiving recess is formed in the pivoting end of the sleeve (60) and has a friction surface.

The pivotal rod (50) has a mounted end, an extending end (51) and an annular shoulder. The mounted end of the pivotal rod (50) is mounted in the pivotal end of the monitor (71). The extending end (51) of the pivotal rod (50) engages the receiving recess of the sleeve (60) so that the monitor (71) can rotate relative to the main frame (72). The extending end (51) of the pivotal rod (50) has at least one slot (52). The at least one slot (52) is formed longitudinally in the pivotal rod (50). The at least one slot (52) of the pivotal rod (50) can control tension of the pivotal rod (50) when the pivotal rod (50) engages the sleeve (60). The annular shoulder is formed between the mounted end and extending end (51) of the pivotal rod (50) and has a friction surface (53). The friction surface (53) of the pivotal rod (50) abuts against the friction surface (61) of the sleeve (60).

When the monitor (71) pivots to open relate to the main frame (72), two friction surfaces (53)(61) rub against to each other so that the monitor (71) can be held at a certain degree. However, the degree of opening of the monitor (71) depends on the friction between the friction surfaces (53)(61). After a period of use, the friction between the friction surfaces (53)(61) is getting lower so that the friction surfaces (53)(61) cannot hold the monitor (71) at the certain degree when the monitor (71) is opened.

To overcome the shortcomings, the present invention provides a hinge to obviate or mitigate the aforementioned problems.

SUMMARY OF THE INVENTION

The primary objective of the present invention is to provide a hinge that holds a monitor at a desired visual angle when the monitor pivots to open relative to a main frame of a portable computer.

The hinge for a portable computer having a monitor with a pivotal end and a main frame with a pivotal end has a sleeve, a washer and a pivotal rod. The sleeve is mounted in the pivotal end of the main frame and has multiple cutouts. The cutouts are formed in the sleeve. The washer has two extensions. The extensions are formed on the washer and selectively engage the cutouts of the sleeve. The pivotal rod is mounted rotatably in the sleeve, is mounted securely in the washer and holds the washer between the pivotal rod and the sleeve. When the monitor pivots to open relative to the main frame of the portable computer, the extensions of the washer engage the cutouts of the sleeve to hold the monitor at a desired visual angle.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
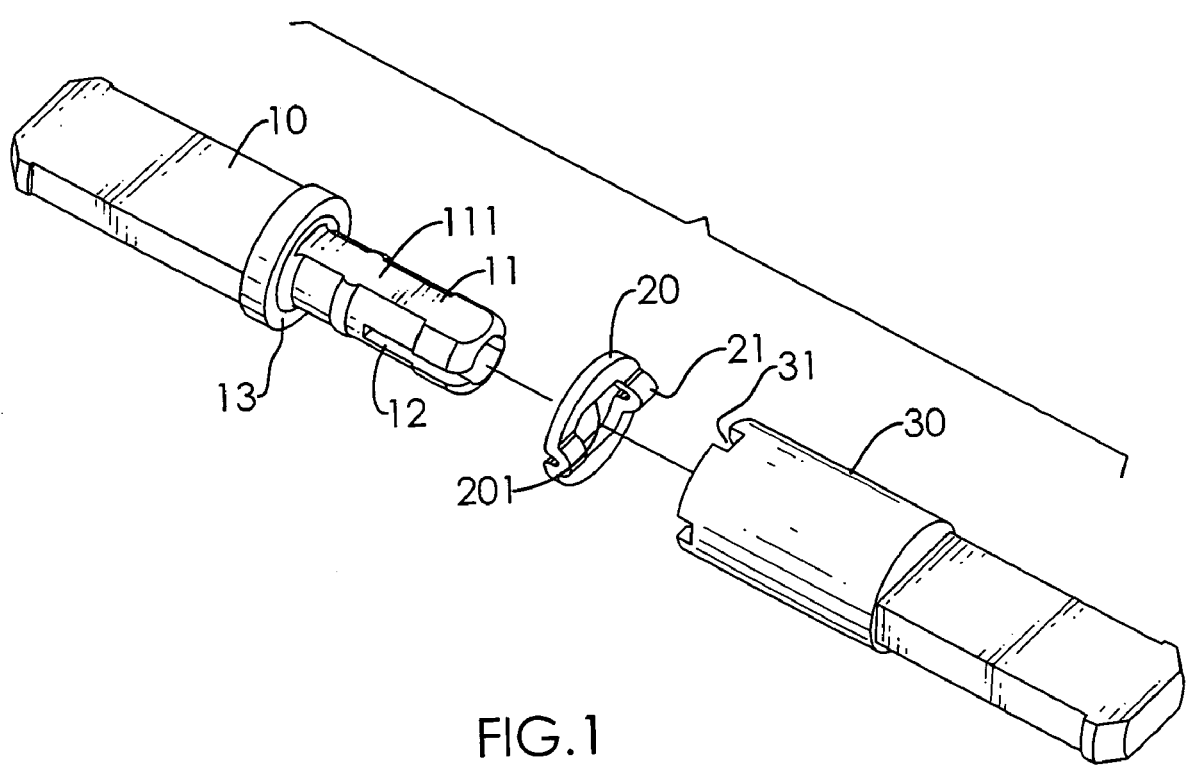
FIG. 1 is an exploded perspective view of a first embodiment of a hinge in accordance with the present invention.
Figure 2:
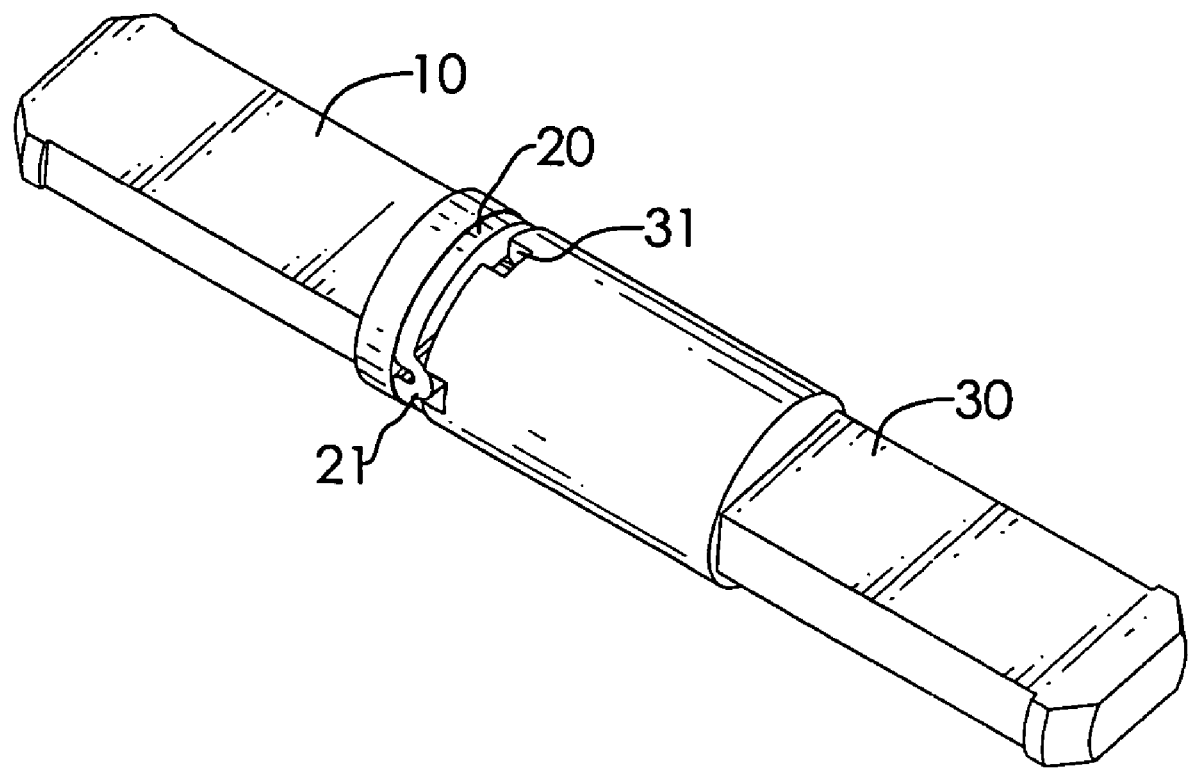
FIG. 2 is a perspective view of the hinge in FIG. 1.

With reference to FIGS. 1, 2, 4, 5 and 7, a hinge in accordance with the present invention for a portable computer having a monitor (42) with a pivotal end and a main frame (41) with a pivotal end, the hinge comprises a sleeve (30)(30A), a washer (20)(20A) and a pivotal rod (10)(10A).

The sleeve (30)(30A) has a mounted end, a pivoting end and a receiving recess. The mounted end of the sleeve (30)(30A) is mounted in the pivotal end of the main frame (41) of the portable computer (40). The receiving recess is formed in the pivoting end of the sleeve (30)(30A) and has an inner surface, an opening and multiple cutouts (31)(31A). The cutouts (31)(31A) are formed separately in the pivoting end of the sleeve (30)(30A) around the opening of the sleeve (30)(30A).

Figure 3:
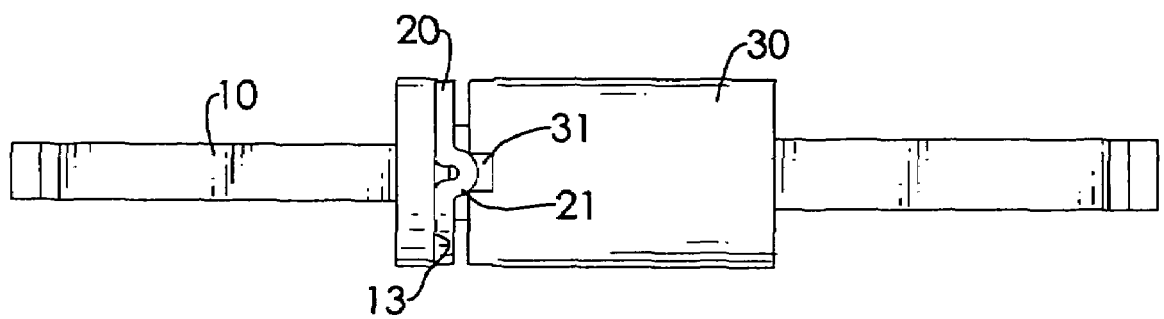
FIG. 3 is a side view of the hinge in FIG. 2.
Figure 6:
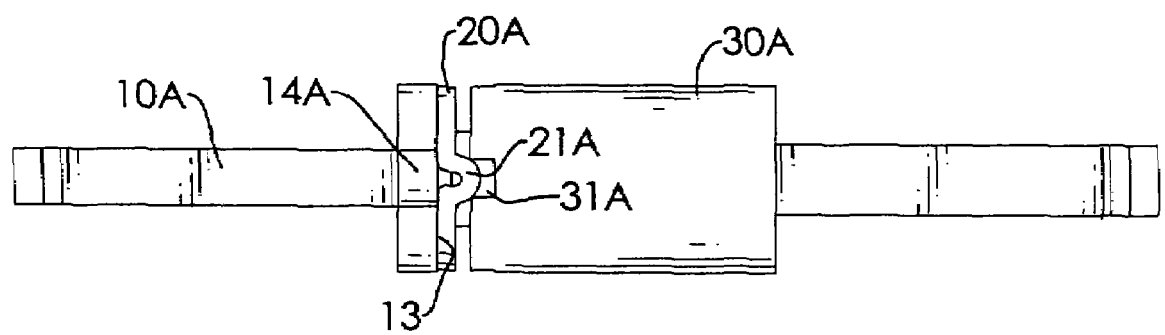
FIG. 6 is a side view of the hinge in FIG. 5.
Figure 4:
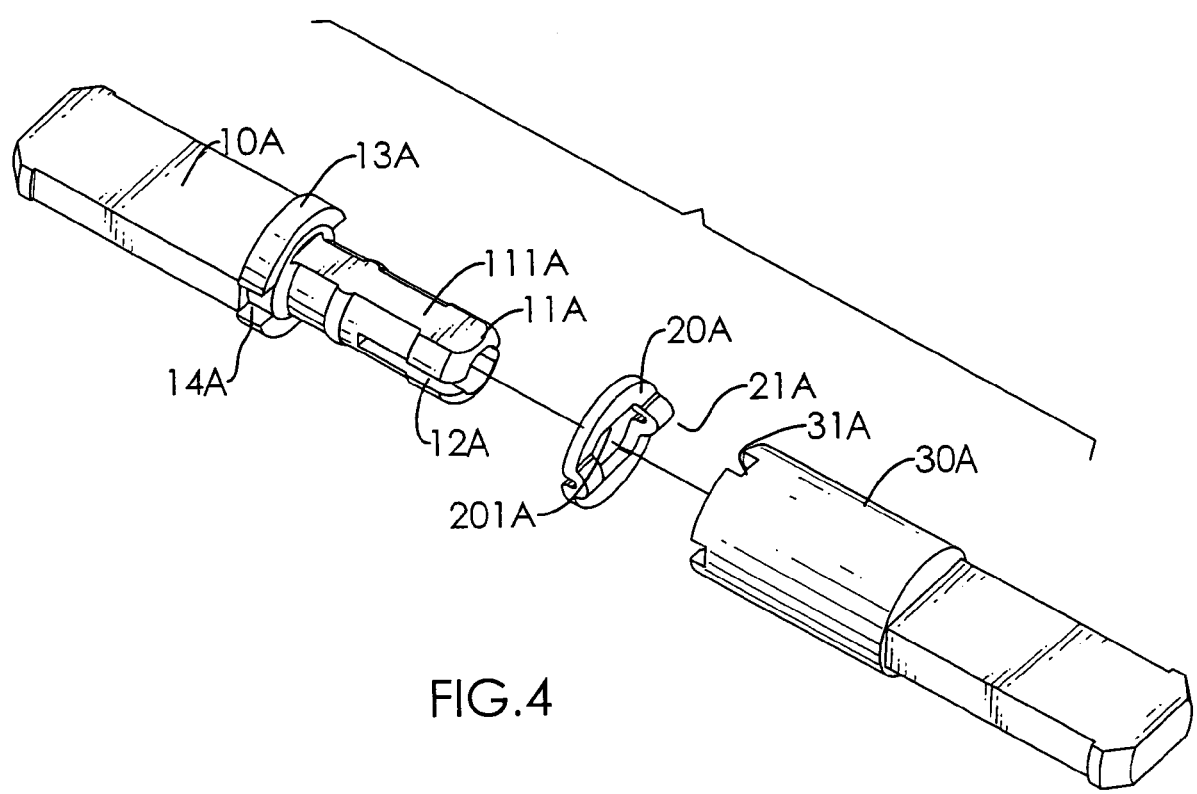
FIG. 4 is an exploded perspective view of a second embodiment of the hinge in accordance with the present invention.
Figure 5:
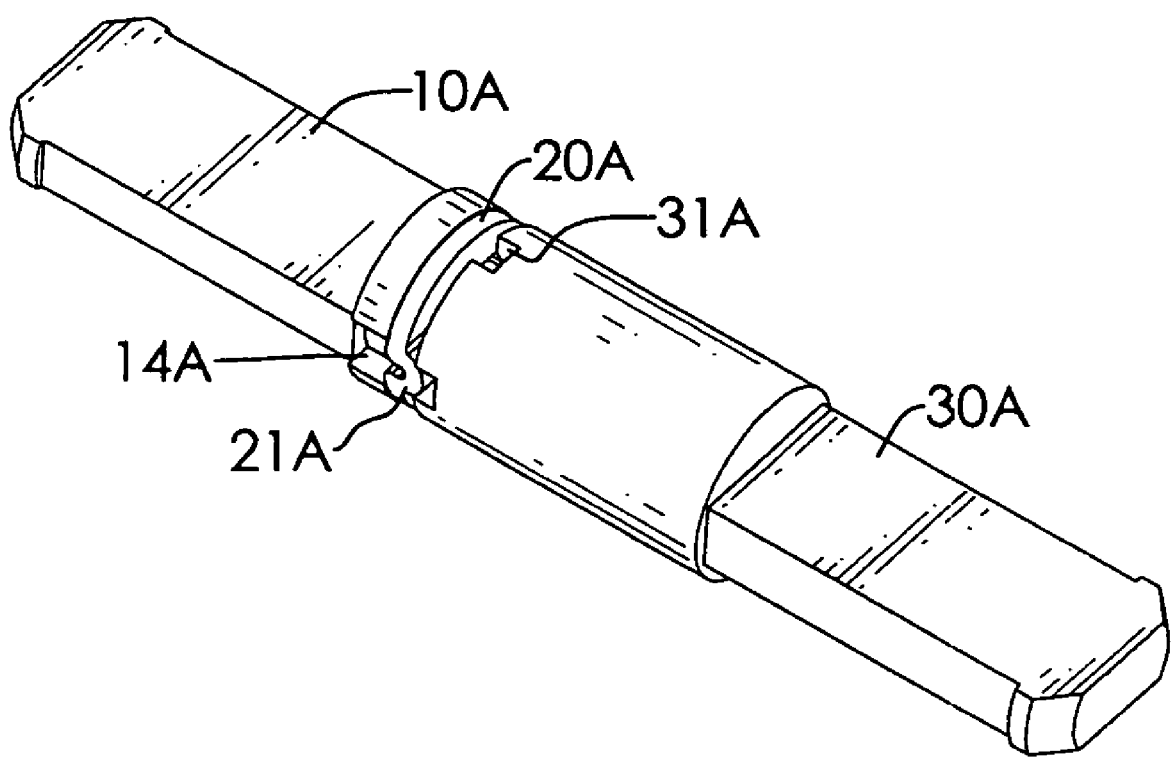
FIG. 5 is a perspective view of the hinge in FIG. 4.

The washer (20)(20A) has a hole, at least one inner flat surface (201)(201A) and two extensions (21)(21A). The hole is formed through the washer (20)(20A). The at least one inner flat surface (201)(201A) defines a portion of a periphery of the hole. With further reference to FIGS. 3 and 6, the extensions (21)(21A) are formed on the washer (20)(20A), are opposite to each other and selectively engage the cutouts of the sleeve (30)(30A).

The pivotal rod (10)(10A) has a mounted end, an extending end (11)(11A) and an annular shoulder (13)(13A). The mounted end of the pivotal (10)(10A) is mounted in the pivotal end of the monitor (42) of the portable computer (40). The extending end (11)(11A) of the pivotal rod (10)(10A) extends through and is mounted securely in the hole of the washer (20)(20A) and is mounted rotatably in the receiving recess of the sleeve (30)(30A) and has an outer surface, at least one flat surface (111)(111A) and at least one slot (12)(12A). The at least one flat surface (111)(111A) is formed on the outer surface of the extending end (11)(11A) of the pivotal rod (10)(10A) and abuts against the at least one inner flat surface (201)(201A) of the washer (20)(20A) to mount the extending end (11)(11A) securely in the hole of the washer (20)(20A) and to allow the pivotal rod (10)(10A) to securely extend through the washer (20)(20A). The at least one slot (12) is formed longitudinally in the extending end (11) of the pivotal rod (10) and can control tension of the extending end (11) of the pivotal rod (10).

The annular shoulder (13)(13A) is formed between the mounted end and the extending end of the pivotal rod (10) (10A) and is adjacent to the washer (20)(20A).

The annular shoulder (13A) has two optional recesses (14A). The recesses (14A) are formed on the annular shoulder (13A), are opposite to each other and correspond to the extensions (21A). The recesses (14A) provide a buffer space for the deformation of the extensions (21A) on the washer (20A) when the extensions (21A) disengage from the cutouts (31A) of the sleeve (30A) and are pressed by the sleeve (30A).

Figure 7:
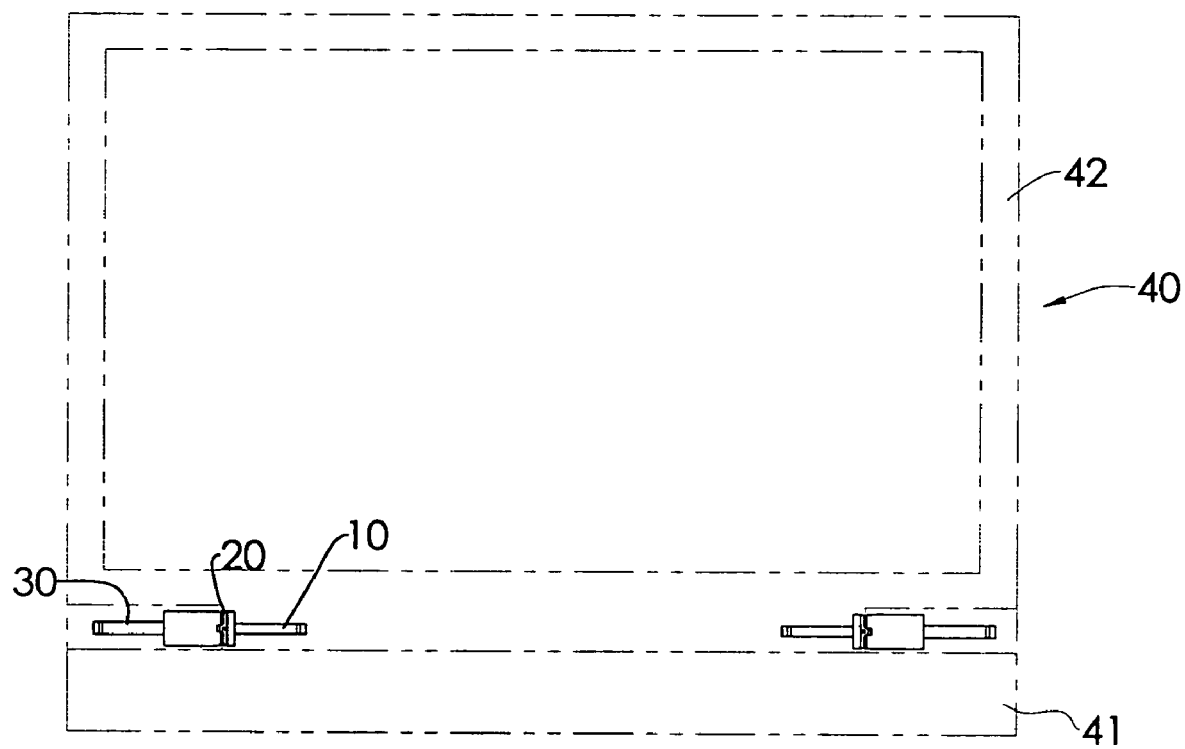
FIG. 7 is an operational side view of the hinge in FIG. 1 when the hinges are mounted in a portable computer.
Figure 8:
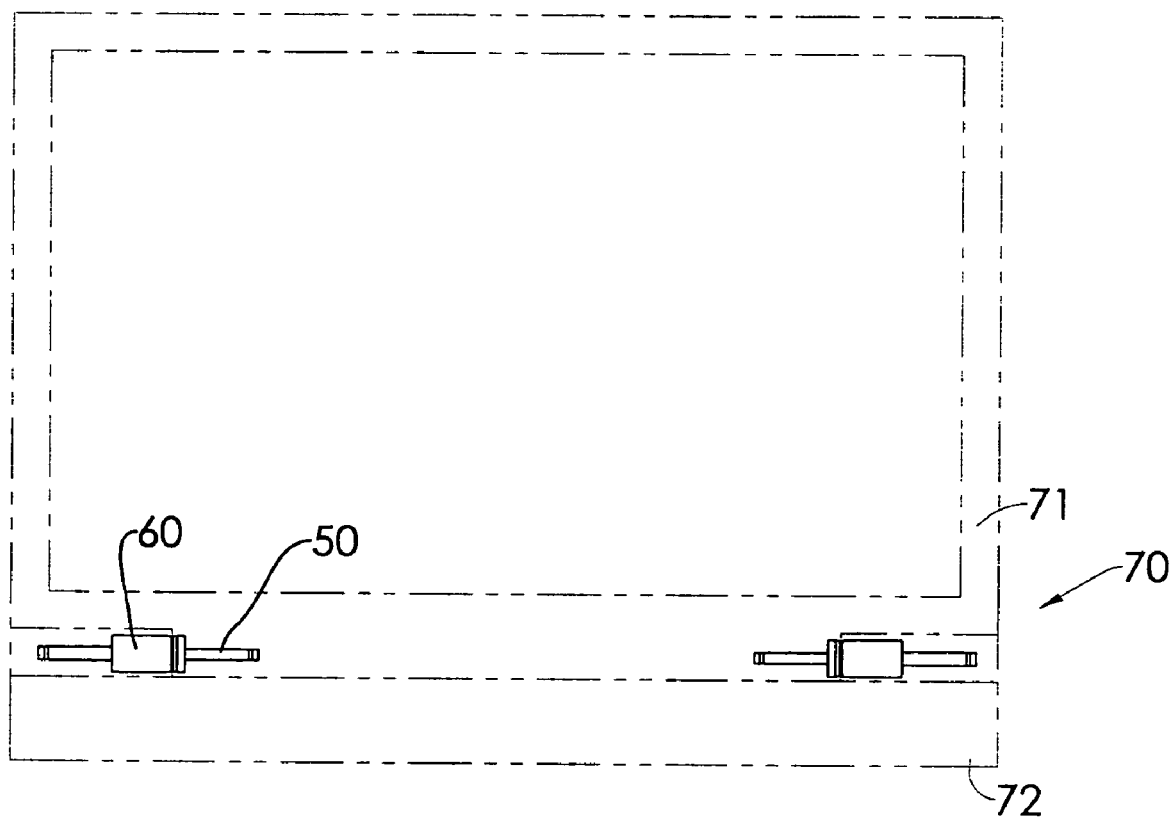
FIG. 8 is a an operational side view of a portable computer with conventional hinges in accordance with the prior art.
Figure 9:
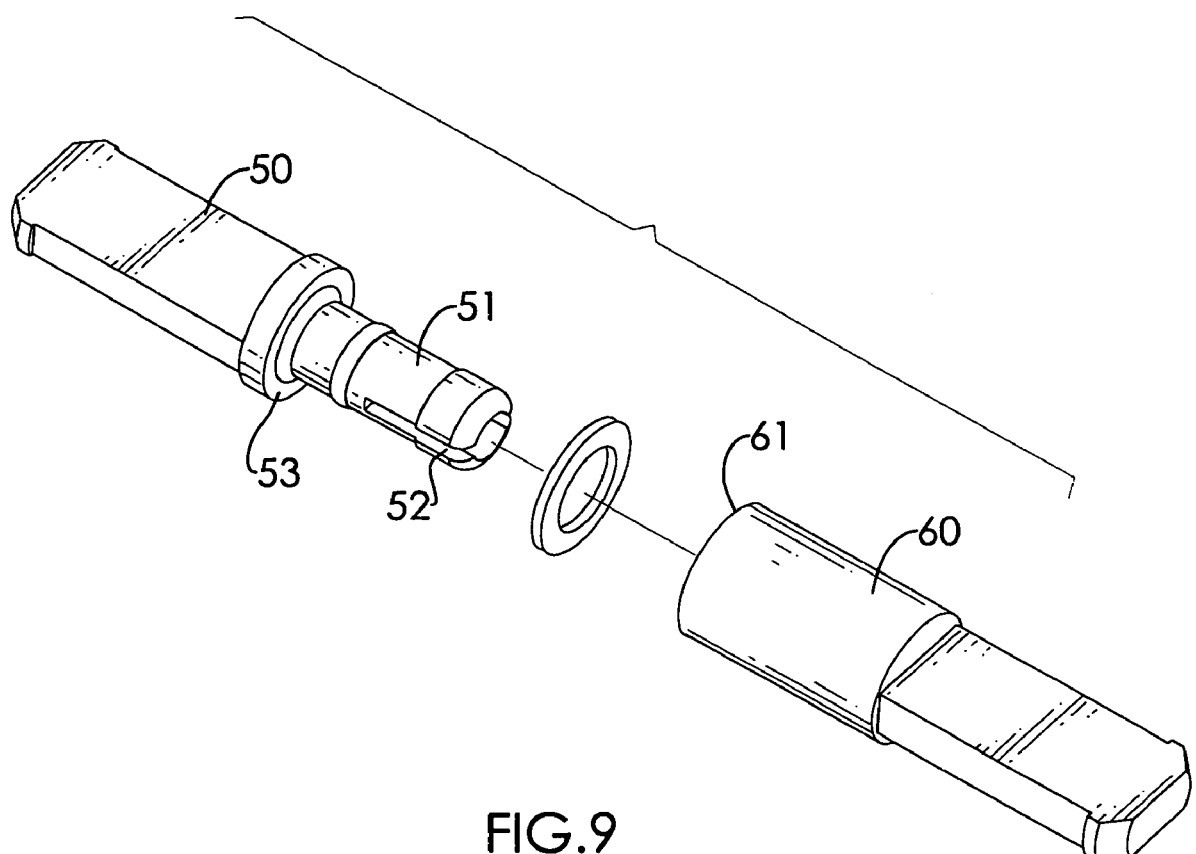
FIG. 9 is an exploded perspective view of the conventional hinge in FIG. 8.

With further reference to FIGS. 3 and 7, when the monitor (41) pivots to open relative to the main frame (42) of the portable computer (40), the pivotal rod (10) and the washer (20) rotate relative to the sleeve (30). When the monitor (41) is opened to a certain visual angle, the extensions (21) of the washer (20) engage the cutouts (31) of the sleeve (30) to hold the monitor (41). Because the monitor (41) is certainly held in position when extensions (21) of the washer (20) engage the cutouts (31) of the sleeve (30), the decreasing of the friction between the pivotal rod (10) and the sleeve (30) does not influence the stability of the portable computer (40). Furthermore, the engagement between the extensions (21) of the washer (20) and the cutouts (31) of the sleeve (30) can make the monitor (41) of the portable computer (40) pivot to open to a desired visual angle.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. A hinge for a portable computer comprising
   a sleeve having
      a mounted end;
      a pivoting end;
      a receiving recess formed in the pivoting end of the sleeve and having
         an inner surface;
         an opening; and
         multiple cutouts formed separately in the pivoting end of the sleeve around the opening of the sleeve;
   a washer having
      a hole formed through the washer;
      at least an inner flat surface defining a portion of a periphery of the hole; and
      two extensions formed on the washer, being opposite to each other and selectively engage the cutouts of the sleeve; and
   a pivotal rod securely extending through the washer, rotatably extending into the sleeve and having
      a mounted end;
      an extending end extending through and mounted securely in the hole of the washer and mounted rotatably in the receiving recess of the sleeve and having
         an outer surface;
         at least one flat surface formed on the outer surface of the extending end of the pivotal rod and abutting a against the at least one inner flat surface of the washer; and
         at least one slot formed longitudinally in the extending end of the pivotal rod; and
      an annular shoulder formed between the mounted end and the extending end of the pivotal rod and abutting with the washer.

2. The hinge as claimed in claim 1, wherein the annular shoulder further has two recesses formed on the annular shoulder, being opposite to each other and corresponding to the extensions of the washer.

* * * * *